United States Patent Office 3,538,423
Patented Nov. 3, 1970

3,538,423
CIRCUIT ARRANGEMENT FOR THE INDEPENDENT CONTROL OF THE OUTPUT VOLTAGE AND OUTPUT CURRENT INTENSITY FOR A REGULATOR
Zdzislaw Goleniewski, Warsaw, Poland, assignor to Zjednoczone Zaklady Elektronicznej Aparatury Pomiarowej, Warsaw el Bialobreska, Poland
Filed Nov. 27, 1967, Ser. No. 685,759
Claims priority, application Poland, Nov. 29, 1966, P 117,642
Int. Cl. G05f 1/50
U.S. Cl. 323—4                    4 Claims

ABSTRACT OF THE DISCLOSURE

A regularly circuit for independently controlling output voltage and output current: the output voltage is compared with a standard voltage and the difference is supplied to a differential amplifier; output current is compared with a standard and supplied to a second differential amplifier, which has its output connected with a bridge circuit. The output of the amplifiers is added and the sum supplied to a control transistor.

---

There are known in the art different regulator circuit arrangements, many including transistors, for output voltage or output current regulation. The characteristic feature of them is the mode of the transition from one to another scheme of operation. The dependence of the control circuit for the output current intensity on the control circuit for the output voltage causes faulty operation of the regular.

This transition is spontaneous and depends on the load resistance of the regulator output. If the load resistance equals the critical resistance of the regular said transition from the stabilization state of the output voltage to the stabilization state of the output current should be performed violently, whereat in principle the output resistance of the regulator should be as low as possible at operation for controlling the output voltage, and on the contrary as high as possible at the operation for controlling the output current intensity.

In known and applied regulator circuit arrangements, a potential divider connected to the output of the regulator limits its output resistance. This is a phenomenon especially undesirable in the output current stabilization range. The potential divider also makes it impossible to properly perform the measurements of the output current intensity, as forming a shunt of the load resistance of the regulator causes in the ammeter a flow not only of the output current but also of the harmful no-load current. Morevover, the differential amplifier connected to the current regulation circuit fails to respond not only to the output current but also to the no-load current of the regulator, as both currents flow over the shunt and affect there the voltage-drop. The difference between the standard voltage and the voltage-drop on the shunt is transposed onto the input of the control amplifier mentioned above, in which the most disadvantageous phenomenon in the output stabilization range are the variations of the output voltage of the differential amplifier affected by the variations of the no-load current of the regulator, loading its output in advance. This disadvantage is eliminated through another regular circuit arrangement in which a diode is connected to a part of the output potential divider. This diode aims at bridging-over the part of the potential divider in case of a voltage-drop on this resistor is intended to limit the harmful influence of the variations of the no-load current $I_0$ on the stabilization of the current $I_2$ of the regulator.

The arrangement mentioned above has the disadvantage that it only partially eliminates the harmful influence of the variations of the no-load current, and it operates properly only in the case of notable variations of the output voltage $U_2$ and remarkable variations of the no-load current intensity $I_0$.

The present invention aims at providing an arrangement of the regulator according to suitable requirements, which should remove the above mentioned disadvantages of known regulators.

According to the present invention this task is accomplished by adding to a known regulator arrangement a balanced bridge circuit consisting of four resistors, through paths of which the no-load current $I_0$ of the feeder flows. In the diagonal of the bridge an ammeter and a differential stabilizing amplifier of the current $I_2$ are connected.

The circuit arrangement of the regulator makes it possible to regulate independently the output voltage and the output current intensity, from zero to the rated value, permits measurement of the current intensity properly, and increases the output resistance of the feeder.

The circuit arrangement of the regulator according to the invention is shown by way of example in the accompanying drawing, where:

Figure 1:
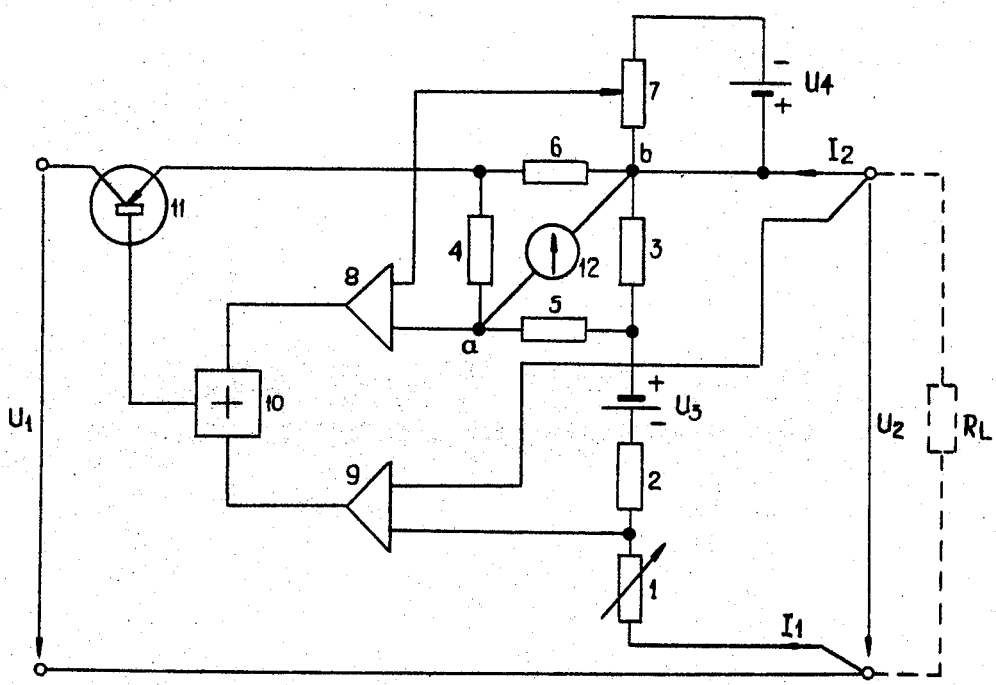
FIG. 1 is the circuit diagram of the present invention.
Figure 2:
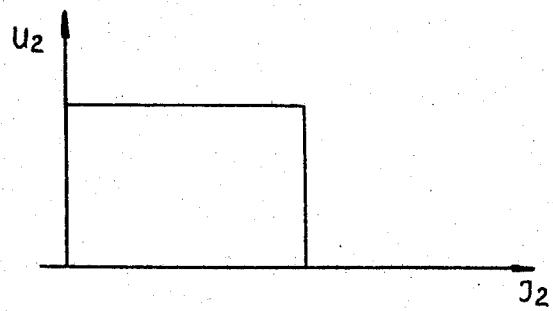
FIG. 2 is its voltage characteristic $U_2 = f/I_2/$ for two different values of the load resistance.

The operation of the circuit arrangement of regulator for the independent control of the output voltage and output current intensity is as follows:

In the output voltage stabilization range $/U_2/$ a part of this voltage is compared with the standard voltage derived from standard voltage source $U_3$. The part of the output voltage $U_2$ being compared is preselected by means of the potentiometer 1. The difference of the voltage-drops caused by the variation of the output voltage $U_2$, which value at the output of the regulator depends on the variation of the load resistance $R_L$ or variations of the input voltage $U_1$, is amplified by means of the differential amplifier 9, and then it is transmitted to the adder 10, which together with the transistor 11 acting in the circuit of the common emitter forms the voltage control arrangement of the regulator. This arrangement counteracts variations of the output voltage $U_2$ over the feedback loop, and so it contributes to stabilization of said voltage.

In the output current intensity $I_2$ stabilization range there is compared the voltage-drop of this current occuring on a resistor 6 with a part of the standard voltage derived from standard voltage source $U_4$ preselected by means of the potentiometer 7. The difference of these voltages caused by the variation of the voltage-drop on the resistor 6 of the therein flowing current $I_2$, which results from the variations of the load resistance $R_L$ at the output of the regulator, and variations of the input voltage $U_1$, is amplified by means of the differential amplifier 8 and then transmitted to the adder 10, which with the transistor 11 forms the output current control arrangement. This arrangement counteracts the variations of the output current intensity $I_2$ over the feedback loop, and so it contributes to the stabilization of the current. The harmful no-load current $I_0$ flowing through branches 3,6 and 5,4 of the bridge circuit affects on them such voltage-drops that the difference of voltages at points $a$ and $b$ of the balanced bridge equals approximately zero. Thus the differential amplifier 8, connected by its input circuit to the point $a$, and by its circuit to the standard voltage source $U_4$ to the point $b$ does not respond to any variations of the no-load current $I_0$ of the regulator.

Nevertheless, it responds simultaneously to the variations of the output current $I_2$ of the regulator, flowing through the resistor 6. The ammeter 12 connected between the points *a* and *b* of said bridge shows the output current intensity $I_2$ exclusively, which current flows through the load.

Since at the input of the amplifier 8 an independence of the influence of the variation of the influence of the variation of the no-load current is achieved, the output resistance of the regulator increases infinitely.

What is claimed is:

1. A circuit for independently controlling output voltage and output current comprising:
   (a) input means for receiving an input current,
   (b) output means for connection to a load,
   (c) first differential amplifier means,
   (d) means for supplying to said first amplier means a difference voltage derived from said output means and a standard voltage source,
   (e) second differential amplifier means,
   (f) a bridge circuit having a first null point connected to the input of the second amplifier and having a second null point connected to said output means,
   (g) a second standard voltage source connected to the input of said second differential amplifier means and to said second null point,
   (h) an adder means having inputs connected to the outputs of said differential amplifiers,
   (i) and translating control means connected between said input means and said output means and to the output of said adder.

2. The circuit of claim 1, wherein one arm of said bridge circuit is connected to said output means and through said translating means to said input means.

3. The circuit of claim 1, and an ammeter connected between the null points of said bridge circuit.

4. The circuit of claim 1, and a variable resistor in the input to said first differential amplifier means.

References Cited

UNITED STATES PATENTS 3,303,412   2/1967   Gately _____ 323—4

J D MILLER, Primary Examiner

GERALD GOLDBERG, Assistant Examiner

U.S. Cl. X.R.

323—9, 20, 22, 40